(12) United States Patent
Horlander (10) Patent No.: US 7,538,819 B2
(45) Date of Patent: *May 26, 2009

(54) ADAPTIVE VIDEO IMAGE INFORMATION PROCESSING SYSTEM

(75) Inventor: Karl Francis Horlander, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 865 days.

This patent is subject to a terminal disclaimer.

(21) Appl. No.: 11/063,194

(22) Filed: Feb. 22, 2005

(65) Prior Publication Data

US 2005/0141714 A1    Jun. 30, 2005

Related U.S. Application Data

(62) Division of application No. 09/712,539, filed on Nov. 14, 2000, now Pat. No. 7,071,995, which is a division of application No. 09/454,398, filed on Dec. 3, 1999, now Pat. No. 6,437,830.

(51) Int. Cl.
*H04N 7/08* (2006.01)
(52) U.S. Cl. .................................... 348/460
(58) Field of Classification Search ......... 348/476–479, 348/473, 460, 465, 554, 558; 386/94, 100, 386/106; 380/21, 20, 5
See application file for complete search history.

(56) References Cited

U.S. PATENT DOCUMENTS

| | | | |
|---|---|---|---|
| 4,866,770 A | 9/1989 | Seth-Smith et al. |
| 4,983,967 A | 1/1991 | McKenzie |
| 5,182,771 A | 1/1993 | Munich et al. |
| 5,493,339 A | 2/1996 | Birch et al. |
| 5,541,662 A | 7/1996 | Adams et al. |
| 5,583,562 A | 12/1996 | Birch et al. |
| 5,590,202 A | 12/1996 | Bestler et al. |
| 5,612,900 A | 3/1997 | Azadegan et al. |
| 5,619,274 A | 4/1997 | Roop et al. |

(Continued)

FOREIGN PATENT DOCUMENTS

DE    3806413 A1    9/1989

(Continued)

OTHER PUBLICATIONS

Broadcast PC Reference Design Exploroer New Applications Horizons Electron Design Nov. 2, 1998.

(Continued)

*Primary Examiner*—Paulos M Natnael
(74) *Attorney, Agent, or Firm*—Robert D. Shedd; Harvey D. Fried; Joel M. Fogelson (57) ABSTRACT

Video image information is received in a signal including conditional access information. The conditional access information is associated with one of a plurality of picture resolution formats for recording, reproducing and displaying the video image information. The conditional access information in the received signal is decoded. A format for at least one of recording, reproducing and displaying the video image information is adaptively selected in response to the decoded conditional access information. The video image information is then processed using the selected format. The conditional access information may further include information indicating a predetermined time period during which reproduction of recorded video image information is permitted.

51 Claims, 4 Drawing Sheets

U.S. PATENT DOCUMENTS

| | | |
|---|---|---|
| 5,659,368 A | 8/1997 | Landis |
| 5,680,457 A | 10/1997 | Bestler et al. |
| 5,703,795 A | 12/1997 | Mankovitz |
| 5,715,403 A | 2/1998 | Stefik |
| 5,745,643 A * | 4/1998 | Mishina .................... 386/106 |
| 5,757,909 A | 5/1998 | Park |
| 5,796,828 A * | 8/1998 | Tsukamoto et al. ......... 380/203 |
| 5,799,081 A | 8/1998 | Kim et al. |
| 5,822,019 A | 10/1998 | Takeuchi |
| 5,822,425 A | 10/1998 | Ezaki et al. |
| 5,862,299 A | 1/1999 | Lee et al. |
| 5,907,366 A | 5/1999 | Farmer et al. |
| 5,907,656 A | 5/1999 | Oguro |
| 5,910,825 A | 6/1999 | Takeuchi |
| 5,963,265 A | 10/1999 | Bae et al. |
| 5,991,499 A | 11/1999 | Yagasaki et al. |
| 5,991,500 A * | 11/1999 | Kanota et al. ................. 386/94 |
| 6,026,164 A | 2/2000 | Sakamoto et al. |
| 6,037,932 A | 3/2000 | Feinleib |
| 6,069,647 A | 5/2000 | Sullivan et al. |
| 6,104,423 A | 8/2000 | Elam |
| 6,104,860 A | 8/2000 | Lee et al. |
| 6,124,893 A | 9/2000 | Stapleton |
| 6,141,488 A | 10/2000 | Knudson et al. |
| 6,154,206 A | 11/2000 | Ludtke |
| 6,157,377 A | 12/2000 | Shah-Nazaroff et al. |
| 6,243,530 B1 | 6/2001 | Kato |
| 6,272,283 B1 | 8/2001 | Nguyen |
| 6,275,988 B1 | 8/2001 | Nagashima et al. |
| 6,282,366 B1 | 8/2001 | Oguro et al. |
| 6,301,430 B1 | 10/2001 | Oguro et al. |
| 6,351,538 B1 | 2/2002 | Uz |
| 6,381,747 B1 | 4/2002 | Wonfor et al. |
| 6,437,830 B1 | 8/2002 | Horlander |
| 6,690,880 B1 * | 2/2004 | Rinaldi ........................ 386/94 |

FOREIGN PATENT DOCUMENTS

| | | |
|---|---|---|
| EP | 0766471 A1 | 4/1997 |
| EP | 0785686 A2 | 7/1997 |
| EP | 0614308 A1 | 9/2004 |
| JP | 11252498 | 9/1999 |
| WO | WO 00/31964 | 2/2000 |
| WO | WO 01/41444 A1 | 6/2001 |

OTHER PUBLICATIONS

TIK-111,550 Seminar on Multimedia, 1998 Autumn, Peng Chengyuan 92777A Integrated Receiver Decoder (IRD), pp. 1-29.

1198 IBM Integrating the MPEG-2 Subsystem for Digital Television, R.E. Anderson, et al. pp. 1-13.

IEEE Sample Articles, S.A. Booth, DTV in the USA, IEEE Spectrum Mar. 1999, vol. 36, No. 3, pp. 1-6.

Miralite Communications—Magnitude MPEG 2 Compressed Digital Video System, The Standard of Excellence in Digital Television, pp. 1 and 2, Technical White Paper.

"Video Systems (525/60 Video and Accompanied Data Using the Vertical Blanking Interval-Analogue Interface", International Standard, CEI IEC 61880, Jul. 30, 1999, 24 pages, IEC, Geneva, Switzerland.

"Transfer Method of Video ID Information Using Vertical Blanking Interval", EIAJ CPR-1204-1 Japan, Technical Report of Electronic Industries Association of Japan, Mar. 1998, 9 pages, Minato-Ku, Tokyo.

* cited by examiner

ADAPTIVE VIDEO IMAGE INFORMATION PROCESSING SYSTEM

This is a divisional application of U.S. patent application Ser. No. 09/712,539 by K. F. Horlander, filed Nov. 14, 2000 now U.S. Pat. No. 7,071,995 which is a divisional application of application Ser. No. 09/454,398, now issued U.S. Pat. No. 6,437,830 by K. F. Horlander, filed Dec. 3, 1999.

RELATED APPLICATIONS

This application is related to divisional application of U.S. patent application Ser. No. 10/632,761 by K. F. Horlander, filed Aug. 1, 2003.

FIELD OF THE INVENTION

The present invention relates to selecting a format for recording, reproducing and display of video image information received with a signal including conditional access information, the conditional access information determining the format for recording, reproduction and display of the video image information.

BACKGROUND OF THE INVENTION

Conditional access systems for subscriber units such as cable subscriber set-top box decoders are well-known in the art. Conditional access is conventionally achieved by downloading one or more authorization levels for storage in the decoder. The stored authorization levels may be represented by a bit map or a list of individual multi-bit codes, or a combination of both. Each received subscription program, which is normally scrambled to prevent access thereto by an unauthorized subscriber, includes an authorization code or conditional access information identifying the associated program. If the conditional access information corresponds to an authorized level in the stored bit map or a stored listed authorization level of the subscriber, a descrambling circuit within the subscriber's decoder is enabled to descramble the signal for viewing by the subscriber. If the received conditional access information does not match any stored authorization level descrambling of the accompanying program is inhibited or prevented.

Such conditional access systems lack the operational flexibility that is desirable for taking advantage of the features and capabilities that are supported by the new generation of digital decoder set top boxes. It is desirable for set top boxes and other decoder systems to be able to provide a user with additional pricing and subscription choices for recording, reproduction and/or display of a video image based upon personal taste and the capabilities of the subscriber's video equipment. The system described herein addresses these needs.

SUMMARY OF THE INVENTION

Video image information is received in a signal including conditional access information. The conditional access information is associated with one of a plurality of picture resolution formats for recording, reproducing and displaying the video image information. The conditional access information in the received signal is decoded. A format for at least one of recording, reproducing and displaying the video image information is adaptively selected in response to the decoded conditional access information. The video image information is then processed using the selected format. The conditional access information may further include information indicating a predetermined time period during which reproduction of recorded video image information is permitted.

DETAILED DESCRIPTION OF THE DRAWING

Figure 1:
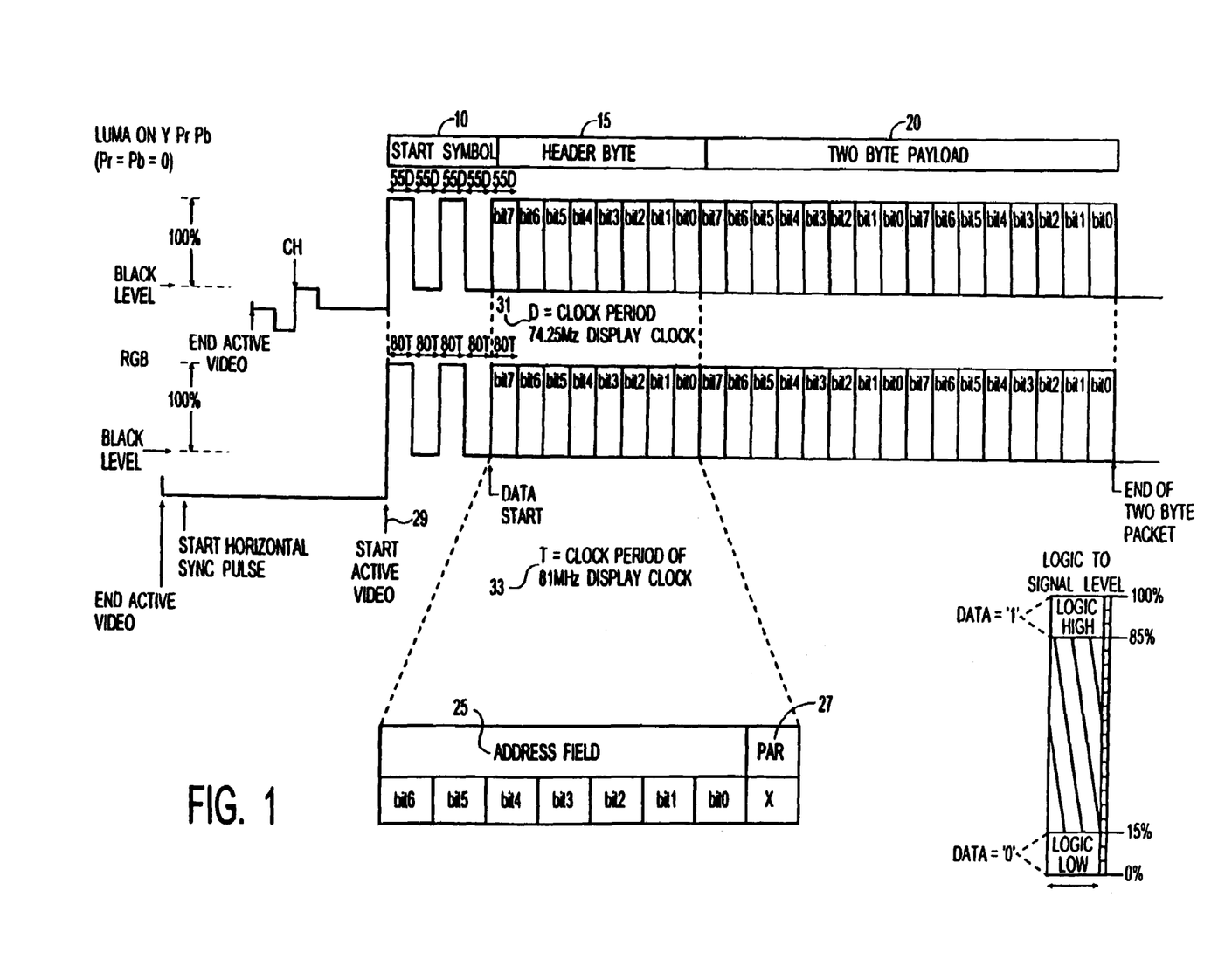
FIG. 1 shows a Vertical Blanking Interval (VBI) data format facilitating adaptive data recovery and decoder operation, according to invention principles.

FIG. 1 shows a Vertical Blanking Interval (VBI) data format facilitating adaptive data recovery and decoder operation. The data format advantageously facilitates adaptive decoder multiple mode operation in different data detection and recovery modes. The data format also advantageously employs a data bit period that accommodates data encoded using clock rates associated with different standards. Specifically, the data format of FIG. 1 employs a quadrature (i.e. a "1010" bit pattern) reference symbol start pulse (item 10 of FIG. 1) of half a byte duration that substantially starts at the start of active video of a horizontal video line (item 29 of FIG. 1). The use of such a quadrature reference symbol, defined to start at the beginning of active video, enables a decoder to detect and recover data by either of two different recovery methods. Such a data format enables a decoder to recover data either by, (a) pulse detection following synchronization to the quadrature reference symbol using a phase locked loop, for example, or (b) line-locked pulse detection, without prior phase locked loop synchronization, based on the known (active video) start time of the reference symbol following the horizontal sync pulse of the analog video signal. Further, the double pulse (i.e. 1010) bit pattern of reference symbol 10 offers improved phase lock loop synchronizing capability over a single pulse (i.e. 10) bit pattern as exemplified by the VBI data signal reference pulse sequence of the EIAJ CPR-1204-1 standard. This is because the reference symbol provides a detector circuit with a larger number of pulse edges for use in detection and synchronization in comparison to the single pulse reference symbol pattern.

The data format of FIG. 1 also employs a data bit period that accommodates data encoded using clock rates associated with different standards. Specifically, the bit period of the FIG. 1 data format is advantageously selected to comprise a first integral multiple of a first clock period associated with a first data format, and a different second integral multiple of a second clock period associated with a second data format. In the data format of FIG. 1 the ancillary data bit period is selected to be a multiple of, (a) 20 times the 27 MHz clock period associated with EIA 770.1 and EIA 770.2 video standards (and also associated with the MPEG system standard ISO 13818-1 section 2.5.2.1), and also a multiple of, (b) 55 times the 74.25 MHz clock period associated with the EIA 770.3 video standard (item 31 of FIG. 1). The resultant selected bit period of the FIG. 1 data format is approximately 741 nano-seconds in duration. In FIG. 1, the ancillary data bit period of item 33 comprises a multiple of 60 times an 81 MHz clock period which is used as a video clock in a number of digital video systems. Also, since the 81 MHz clock period is an integral multiple (i.e. a 3 times multiple) of a 27 MHz clock period the bit period of the FIG. 1 data format accommodates data encoded using 81 MHz, 27 MHz, and 74.25 MHz (and other integral multiple) clock rates associated with different standards.

The multi-standard compatible bit period of the data format of FIG. 1 enables ancillary data to be encoded by devices operating with clock frequencies associated with any one of a number of different standards e.g. with the 27 MHz clock frequency of the EIA 770.1, EIA 770.2 or MPEG standards or with the 74.25 MHz frequency of the EIA 770.3 standard. The resultant ancillary data, incorporated within an analog video signal VBI (and compatible with the format of FIG. 1), is recoverable and decodable by a decoder without the need to know the standard employed by the originating device.

The features of the FIG. 1 data format facilitate adaptive data recovery by either, (a) phase locked loop synchronized pulse detection and (b) line-locked pulse detection independent of phase locked loop synchronization. These features also facilitate the adaptive decoding of ancillary data provided by devices operating using different video coding standards (e.g. EIA 770.1, EIA 770.2, EIA 770.3 or MPEG standards). Further, the combination of quadrature reference symbol and multi-standard compatible bit period provides significant flexibility, adaptability and simplicity advantages for inter-device communication between cost sensitive consumer devices such as televisions (including analog, digital and high definition TV (HDTV)), VCRs, digital video disk (DVD) players and set top boxes etc.

The FIG. 1 data format supports communication of multiple data types and services including, captions, conditional access information, copy protection data, configuration information, display format/standard identification data, descriptive data and control information. This information is conveyed in the ancillary data format of FIG. 1 on a horizontal line in the VBI e.g. on line 42 of a 2H display system (a display system using substantially twice the NTSC horizontal line rate). Alternatively, it may be incorporated on this line or another line in a 1H or 2.14H or other line rate system. The ancillary data format includes a header byte (item 15 of FIG. 1) that identifies a destination service for a payload of the ancillary data or an address identifying a destination of the payload. The address comprises 7 bits (item 25) and a single parity bit (item 27). The parity bit in the address header enables error detection to be performed on individual header bytes. The address bits (item 25) may comprise a service identifier e.g. identifying payload data as being caption, configuration, display format, video standard, conditional access, copy protection, description or other control information. Alternatively, the address bits may comprise another identifier associated with the payload data and the parity bit may be omitted.

The ancillary data format also includes two payload bytes (item 20 of FIG. 1) as may be used for EIA770.3 standard communication, for example. In other embodiments, the data format structure may include different numbers of header and payload bytes. The header address or service identifier (item 15) is associated with the two byte payload (item 20). One or more of the payload data bits may also be allocated as a parity bit for use in detecting payload errors in individual payload data segments (e.g. for individual bytes or for both bytes together). The payload data may also be used to transport larger messages in multiple video frames conveyed in multiples of two byte segments. For this purpose, the header (or payload in another embodiment) includes information that indicates a message is being sent in multiple horizontal line ancillary data segments and that may also enable the segments to be assembled into a single message. Further, an error detection and/or correction code may be conveyed with the payload data to validate and correct messages.

Figure 2:
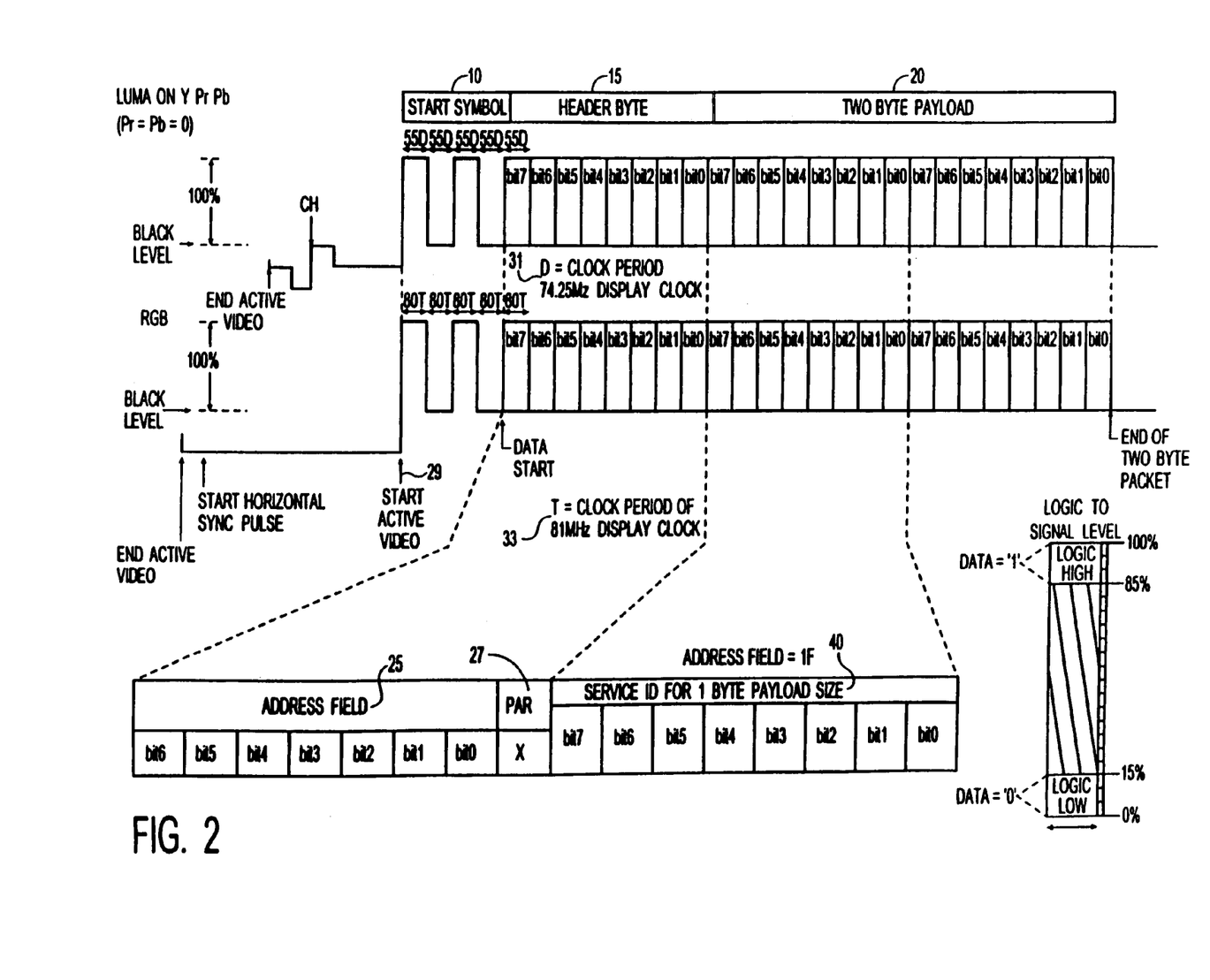
FIG. 2 shows the Vertical Blanking Interval (VBI) data format of FIG. 1 incorporating a particular configuration of header and payload data, according to invention principles.

FIG. 2 shows the Vertical Blanking Interval (VBI) data format of FIG. 1 incorporating a particular configuration of header and payload data. FIG. 2 shows a single byte payload as may be used for EIA770.3 standard communication, for example. In FIG. 2, the first payload byte is allocated to be a service identifier (item 40). Consequently, both an address (item 15) and a service identifier (item 40) are associated with a single byte payload (the remaining byte of item 20). As a result, the payload data may be flexibly processed by different devices for different functions. Alternatively, both the header byte (item 15) and one byte of the payload (item 20) may be used to provide a single 16 bit address or service identifier. Thereby extending the range of identifiers and addresses that may be used.

The ancillary data is encoded on luminance information (Y) in a Y Pr Pb luminance-chrominance format video signal. The ancillary data may also be identically encoded on each of the color signals in an RGB format video signal or may be conveyed on only or two of the color signals. Alternatively, each individual component signal of an RGB or Y Pr Pb format video signal may be used to convey different ancillary data. The ancillary data may be similarly conveyed in the component video signals of other format video signals.

Figure 3:
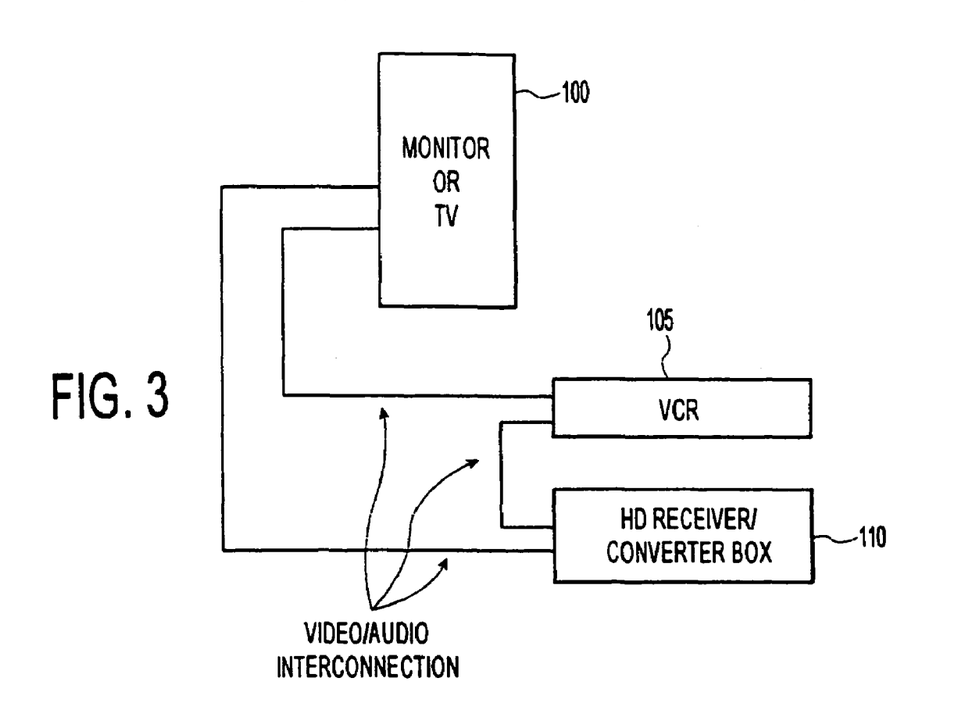
FIG. 3 shows a video system including a High Definition (HD) video decoder, a video monitor and a VCR employing the VBI ancillary data format of FIG. 1 for selecting decoder processing functions based on copy protection information, according to invention principles.

FIG. 3 shows a video system including a High Definition (HD) video decoder 110, a video monitor (e.g. TV) 100 and a VCR 105 employing the VBI ancillary data format of FIG. 1 for selecting decoder processing functions based on copy protection information. In other embodiments, decoder 110 and monitor 100 may be combined in a single unit. The copy protection information is compatible with a Copy Generation Management System (CGMS) document (including CGMSA—analog and CGMSD—digital versions) referenced in a proposed Video Home Recording Act of Mar. 14, 1996 intended for submission to the 104$^{th}$ Congress (as yet not submitted), but may alternatively conform to other formats. In the system of FIG. 3, the ancillary data format of FIG. 1 is used to adaptively convey and update copy protection configuration information for different video display formats and modes. Specifically, the ancillary data is used to provide different display and record privileges for different display formats or record modes. Such different display formats may include, for example, high definition TV (HDTV) or standard definition TV (SDTV) formats. The different recording modes may include, for example, modes involving recording text, captions, web pages, or Picture-in Picture (PIP) images associated with individual programs. The ancillary data format of FIG. 1 may also be used to communicate other control information between a decoder and a display or record device or between other devices for optimizing video and audio reproduction. Such additional control information may include audio control and program description data, parental ratings information and also date and time information. Thus, a simple monitor could look at this data and automatically optimize and configure its display and audio reproduction functions.

In the system of FIG. 3, video decoder 110 adaptively decodes and converts received broadcast high definition video data to provide either high definition (HD) digital MPEG compatible video data, standard definition (SD) digital MPEG compatible video data or an analog composite video signal for storage on VCR 105. Decoder 110 configures VCR 105 for both recording mode and copy protection processing modes using control and configuration information conveyed in the ancillary data (per the FIG. 1 format) in the VBI of the NTSC compatible composite video output by decoder 110. Note, the ancillary data in the composite video signal is advantageously used to configure VCR 105 in all recording modes e.g. in modes comprising recording a program in digital MPEG compatible HD signal format or digital MPEG compatible SD signal format or as an analog composite video signal.

In an exemplary recording mode, decoder 110 provides high definition MPEG compatible digital video data representing a program to VCR 105 for recording. Decoder 110 configures VCR 105 to record the high definition MPEG data it receives in high definition format using configuration data conveyed in ancillary data in the VBI of the NTSC compatible composite video output by decoder 110 to VCR 105. VCR 105 is a multi-function unit capable of converting between different video formats both for recording and upon playback. For this purpose, VCR 105 contains an upsampling interpolator for converting SD video data to HD video data and a downsampling interpolator for converting HD video data to SD video data. VCR 105 also contains MPEG decoding/encoding and analog to digital and digital to analog conversion and sampling functions to convert between digital HD and SD data and analog composite video data. VCR 105 selects a signal recording format and converts the input signal data (HD, SD or composite analog) to the desired format for recording, in response to configuration and copy protection information received from decoder 110. VCR 105 also blocks recording or playback of prohibited material in response to the copy protection information.

The signal format conversion capability of VCR 105 enables VCR 105 to adaptively select a signal format for recording or playback, in response to copy protection information received from decoder 110. Thereby, VCR 105 advantageously selects play back or recording modes (and associated display formats) as well as subsequent copying limitations (e.g. prohibiting subsequent copying, allowing one subsequent copy, or unlimited subsequent program copying) based on copy protection data reflecting User designated billing and conditional access options. As a result, a User may only be allowed to record a program in a particular format and to view a program on playback in a particular format based on the User's pre-selected billing options. Such a particular format may comprise, for example, one of the HD, SD or analog signal formats. Similarly, the copy protection data may allow time based limitations based on a User's pre-selected billing options. Such limitations may permit a User to view a program upon playback for a limited period e.g. 3 months only. In addition, the copy protection data may allow a combination of time based and signal format limitation allowing playback and display of a program for a specific period (e.g. 3 months) in one format (e.g. HD format) and another period (e.g. a subsequent year) in a different format (e.g. SD format), for example.

It is to be noted that in other embodiments VCR 105 may receive and process MPEG SD video data or an analog composite video signal for recording. Also, VCR 105 may include the capability of converting between different display formats including, a 1H line rate format, a 2H line rate format and a 2.14H line rate format and other formats either for recording or upon playback. VCR 105 may also include the capability of providing a desired interlaced format (e.g. 1920×720 pixel resolution) or progressive format (e.g. 1920×720 pixel resolution) for recording operation or upon playback, by the use of additional sample rate converter interpolation functions. Further, the adaptive conversion and copy protection functions of VCR 105 may alternatively be located in a separate unit e.g. decoder 110 or in a single combined unit that includes the functions of both decoder 110 and VCR 105.

Figure 4:
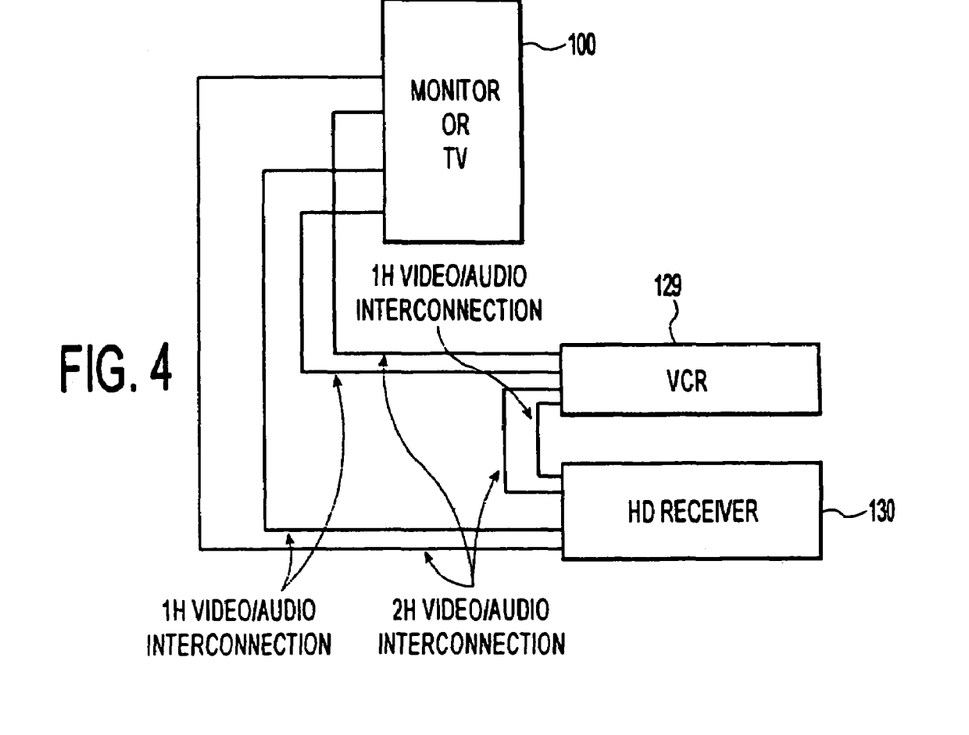
FIG. 4 shows a video system similar to the system of FIG. 3 employing the VBI ancillary data format of FIG. 1 for selecting further decoder configurations, according to invention principles.

FIG. 4 shows a video system similar to the system of FIG. 3 employing the VBI ancillary data format of FIG. 1 for selecting further decoder configurations. The FIG. 4 system includes High Definition (HD) video decoder 130, a video monitor (e.g. TV) 100 and a VCR 129 employing the VBI ancillary data format of FIG. 1 for selecting decoder processing functions based on copy protection information. Decoder 130 advantageously provides both 1H and 2H line rate format signals to VCR 129 and video monitor 100. This enables decoder 130 to configure VCR 129 using the ancillary data format of FIG. 1 (conveyed in the 1H or 2H composite signal VBI) to process either 1H (e.g. NTSC format) or 2H (e.g. 1920×1080 pixel resolution) video and audio formats. Further, VCR 129 includes the capability of converting between 1H line rate format, a 2H line rate format (or 2.14H line rate format) either for recording or upon playback. Alternatively, this conversion may be performed within decoder 130.

Figure 5:
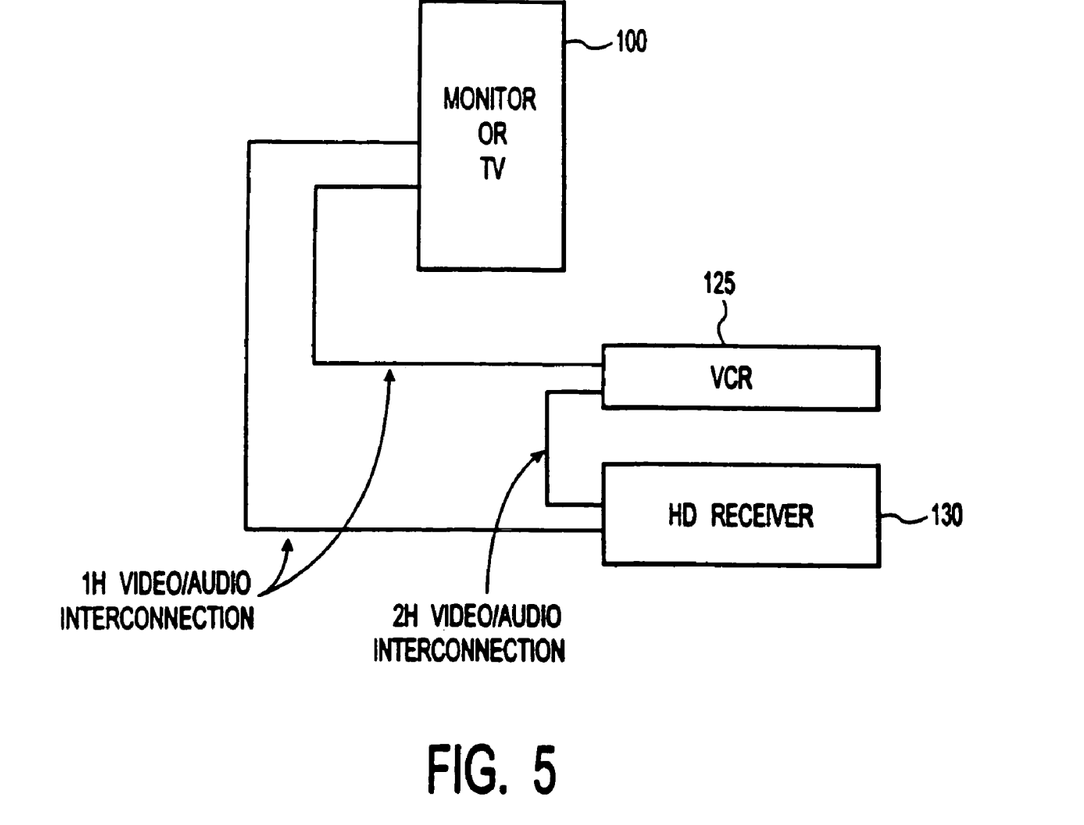
FIG. 5 shows a video system similar to the system of FIG. 3 employing the VBI ancillary data format of FIG. 1 used in another decoder configuration, according to invention principles.

FIG. 5 shows a video system similar to the system of FIG. 3 employing the VBI ancillary data format of FIG. 1 used in another decoder configuration. The FIG. 5 system includes High Definition (HD) video decoder 130, a 1H line rate display format video monitor (e.g. TV) 100 and a 2H line rate format VCR 125 employing the VBI ancillary data format of FIG. 1. In the FIG. 5 system, decoder 130 both communicates with and configures monitor 100, using ancillary data conveyed in the VBI of a 1H line rate (e.g. NTSC compatible) analog composite video signal. Further, decoder 130 communicates with, and configures, VCR 125 using ancillary data conveyed in the VBI of a 2H line rate (e.g. EIA 770.1 compatible) analog composite video signal. In an exemplary recording mode, decoder 130 provides 2H line rate compatible analog composite video representing a high definition program to VCR 125 for recording. Decoder 110 also configures VCR 125 to record this program in 2H line rate format. In playback mode, VCR 125 converts the recorded 2H line rate format video to 1H line rate format video for output to monitor 100 for display. This is performed in response to User initiation of a playback command and configuration information conveyed from decoder 130, identifying the display monitor as a 1H format monitor. Alternatively, VCR 125 may convey the 2H line rate video to decoder 130 for conversion by decoder 130 to 1H line rate format and display on monitor 100. In another embodiment, VCR 125 converts the 2H line rate format video, from decoder 130, to 1H line rate format for recording in 1H format in response to configuration information conveyed from decoder 130 in the VBI of the 1H line rate signal. The recorded 1H line rate video is output to monitor 100 for display in response to User initiation of a playback command.

The ancillary data structure of FIGS. 1 and 2 is not constrained to be conveyed in analog composite video of 1H, 2H or 2.14H line rates but may be conveyed in an analog or digital video signal using any line rate. Further, the ancillary data may be used for control purposes in other system configurations not just those described in connection with FIGS. 3-5. In addition, other ancillary data structures may be derived in accordance with the principles embodied in the adaptive data recovery and multi-standard compatibility characteristics of the format of FIGS. 1 and 2.

What is claimed is:

1. A method of selecting a format for displaying video image information received in a signal including conditional access information, said method comprising the steps of:
   a) receiving said signal including video image information and conditional access information associated with a plurality of picture resolution formats;
   b) decoding said conditional access information in said received signal, wherein said decoded conditional access information comprises data used for determining picture resolution formats available for at least one of:
      i) recording said video image information; and
      ii) reproducing said recorded video image information;
   c) adaptively selecting a picture resolution format in response to said decoded conditional access information; and
   d) processing said video image information using said selected picture resolution format.

2. The method of claim 1, wherein selection of said picture resolution format is in response to said decoded conditional access information determining user entitlement to select one of said plurality of available picture resolution formats.

3. The method of claim 1, wherein said picture resolution format is one of:
   i) a standard definition format; and
   ii) a high definition format.

4. The method of claim 1, further comprising the step of recording said video image information in said selected picture resolution format on a recording medium.

5. The method of claim 4, further comprising the step of reproducing said recorded video image information in said selected picture resolution format on a display.

6. The method of claim 1, wherein said video image information of said received signal is transmitted as a digital signal on a first channel.

7. The method of claim 6, further comprising the step of receiving ancillary data transmitted on a second channel for controlling processing of said video image data.

8. The method of claim 7, wherein said ancillary data is transmitted as an analog video signal.

9. The method of claim 1, wherein each of said plurality of picture resolution formats is associated with a respective billing rate and further comprising the step of billing a user at the billing rate associated with a selected one of said plurality of picture resolution formats.

10. A method in a video receiver of selecting a format for displaying video image information received in a signal where said video image information is received in a single picture resolution and said signal includes conditional access information, said method comprising the steps of:
    receiving said signal including video image information and conditional access information associated with one of a plurality of available picture resolution formats;
    decoding said conditional access information in the received signal, wherein said decoded conditional access information comprises data relating to picture resolution formats available for at least one of:
    recording said video image information; and
    reproducing said recorded video image information; and
    data controlling subsequent copying of said recorded video image information
    adaptively selecting a picture resolution format in response to said decoded conditional access information; and
    processing said video image information using said selected picture resolution format by performing an upconversion operation as to change the video image information from its picture resolution format the signal is received in into a different picture resolution format.

11. The method of claim 10, wherein selection of said picture resolution format is in response to said decoded conditional access information determining user entitlement to select one of said plurality of available picture resolution formats.

12. The method of claim 10, wherein said picture resolution format is one of:
    a standard definition format; and
    a high definition format.

13. The method of claim 10, further comprising the step of reproducing said recorded video image information in said selected picture resolution format on a recording medium.

14. The method of claim 13, further comprising the step of reproducing said recorded video image information in said selected picture resolution format on a display.

15. The method of claim 10, wherein said video image information of said received signal is transmitted as a digital signal on a first channel.

16. The method of claim 10, wherein each of said plurality of picture resolution formats is associated with a respective billing rate and further comprising the step of billing a user at the billing rate associated with a selected one of said plurality of picture resolution formats.

17. A method of selecting in a video receiver a format for displaying video image information received in a signal information where said video image information is received in a single picture resolution and said signal includes copy protection information, said method comprising the steps of:
    receiving said signal including video image information and copy protection information associated with one of a plurality of available display formats;
    decoding said copy protection information in the received signal, wherein said copy protection information comprises data relating to display formats available for at least one of:
    recording said video image information; and
    reproducing said recorded video image information; and
    data controlling subsequent copying of said recorded video image information
    adaptively selecting a display format for displaying said video image information on a display in response to said decoded copy protection information; and
    processing said video image information using said selected display format by performing an upconversion operation as to change the video image information from its single display format the signal is received in into a different display format.

18. The method of claim 17, wherein selection of said display format is in response to said decoded copy protection information determining user entitlement to select one of said plurality of available display formats.

19. The method of claim 17, wherein said display format is one of:
    a standard definition format; and
    a high definition format.

20. The method of claim 17, further comprising the step of recording said video image information in a format determined by said decoded copy protection information on a recording medium.

21. The method of claim 20, further comprising the step of reproducing said recorded video image information in said format determined by said decoded copy protection information on a display.

22. The method of claim 17, wherein said video image information of said received signal is transmitted as a digital signal on a first channel.

23. The method of claim 17, wherein each of said plurality of display formats is associated with a respective billing rate and further comprising the step of billing a user rate at the billing rate associated with a selected one of said plurality of display formats.

24. A method of selecting in a video recorder a format for recording video image information received in a signal where said signal is received in a single format and said signal includes copy protection information, said method comprising the steps of:
   receiving said signal including video image information and copy protection information associated with one of a plurality of available recording formats;
   decoding said copy protection information in the received signal;
adaptively selecting a recording format for recording said video image information on a recording medium in response to said decoded copy protection information; and
   processing said video image information using said selected recording format as to perform an upconversion operation as to change said video signal from the picture resolution of the recording format the signal is received in to a different recording format which a different picture resolution format.

25. The method of claim 24, wherein selection of said different picture resolution format is in response to said decoded conditional access information determining user entitlement to select one of said plurality of available picture resolution formats.

26. The method of claim 24, further comprising the step of reproducing said recorded video image information in said selected picture resolution format on a recording medium.

27. The method of claim 26, further comprising the step of reproducing said recorded video image information in said selected picture resolution format on a display.

28. The method of claim 24, wherein said copy protection information further includes information indicating a time period during which said processed video image information is able to be reproduced.

29. The method of claim 28, wherein said time period is set in response to said decoded copy protection information determining user entitlement to select one of said plurality of available recording formats.

30. The method of claim 24, wherein said video image information of said received signal is transmitted as a digital signal on a first channel.

31. A method in a video receiver of selecting a format for displaying video image information received in a signal where said video image information is received in a single picture resolution and said signal includes conditional access information, said method comprising the steps of:
   receiving said signal including video image information and conditional access information associated with one of a plurality of available picture resolution formats;
   decoding said conditional access information in the received signal, wherein said decoded conditional access information comprises data relating to picture resolution formats available for at least one of:
      recording said video image information; and
      reproducing said recorded video image information; and
      data controlling subsequent copying of said recorded video image information
   adaptively selecting a picture resolution format in response to said decoded conditional access information; and
   processing said video image information using said selected picture resolution format by performing a downconversion operation as to change the video image information from its picture resolution format the signal is received in into a different picture resolution format.

32. The method of claim 31, wherein selection of said picture resolution format is in response to said decoded conditional access information determining user entitlement to select one of said plurality of available picture resolution formats.

33. The method of claim 31, wherein said picture resolution format is one of:
   a standard definition format; and
   a high definition format.

34. The method of claim 31, further comprising the step of reproducing said recorded video image information in said selected picture resolution format on a recording medium.

35. The method of claim 34, further comprising the step of reproducing said recorded video image information in said selected picture resolution format on a display.

36. The method of claim 31, wherein said video image information of said received signal is transmitted as a digital signal on a first channel.

37. The method of claim 31, wherein each of said plurality of picture resolution formats is associated with a respective billing rate and further comprising the step of billing a user at the billing rate associated with a selected one of said plurality of picture resolution formats.

38. A method of selecting in a video receiver a format for displaying video image information received in a signal information where said video image information is received in a single picture resolution and said signal includes copy protection information, said method comprising the steps of:
   receiving said signal including video image information and copy protection information associated with one of a plurality of available display formats;
   decoding said copy protection information in the received signal, wherein said copy protection information comprises data relating to display formats available for at least one of:
      recording said video image information; and
      reproducing said recorded video image information; and
      data controlling subsequent copying of said recorded video image information
   adaptively selecting a display format for displaying said video image information on a display in response to said decoded copy protection information; and
   processing said video image information using said selected display format by performing a downconversion operation as to change the video image information from its single display format the signal is received in into a different display format.

39. The method of claim 38, wherein selection of said display format is in response to said decoded copy protection information determining user entitlement to select one of said plurality of available display formats.

40. The method of claim 38, wherein said display format is one of:
   a standard definition format; and
   a high definition format.

41. The method of claim 38, further comprising the step of recording said video image information in a format determined by said decoded copy protection information on a recording medium.

42. The method of claim 41, further comprising the step of reproducing said recorded video image information in said format determined by said decoded copy protection information on a display.

43. The method of claim 38, wherein said video image information of said received signal is transmitted as a digital signal on a first channel.

44. The method of claim 38, wherein each of said plurality of display formats is associated with a respective billing rate and further comprising the step of billing a user rate at the billing rate associated with a selected one of said plurality of display formats.

45. A method of selecting in a video recorder a format for recording video image information received in a signal where said signal is received in a single format and said signal includes copy protection information, said method comprising the steps of:
receiving said signal including video image information and copy protection information associated with one of a plurality of available recording formats;
decoding said copy protection information in the received signal;
adaptively selecting a recording format for recording said video image information on a recording medium in response to said decoded copy protection information; and
processing said video image information using said selected recording format as to perform a downconversion operation as to change said video signal from the picture resolution of the recording format the signal is received in to a different recording format which a different picture resolution format.

46. The method of claim 45, wherein selection of said different picture resolution format is in response to said decoded conditional access information determining user entitlement to select one of said plurality of available picture resolution formats.

47. The method of claim 45, further comprising the step of reproducing said recorded video image information in said selected picture resolution format on a recording medium.

48. The method of claim 45, further comprising the step of reproducing said recorded video image information in said selected picture resolution format on a display.

49. The method of claim 45, wherein said copy protection information further includes information indicating a time period during which said processed video image information is able to be reproduced.

50. The method of claim 49, wherein said time period is set in response to said decoded copy protection information determining user entitlement to select one of said plurality of available recording formats.

51. The method of claim 45, wherein said video image information of said received signal is transmitted as a digital signal on a first channel.

\* \* \* \* \*